G. E. H. WOODS.
APPARATUS FOR DRESSING STONE.
APPLICATION FILED JUNE 28, 1915.
1,236,894.
Patented Aug. 14, 1917.
2 SHEETS—SHEET 1.
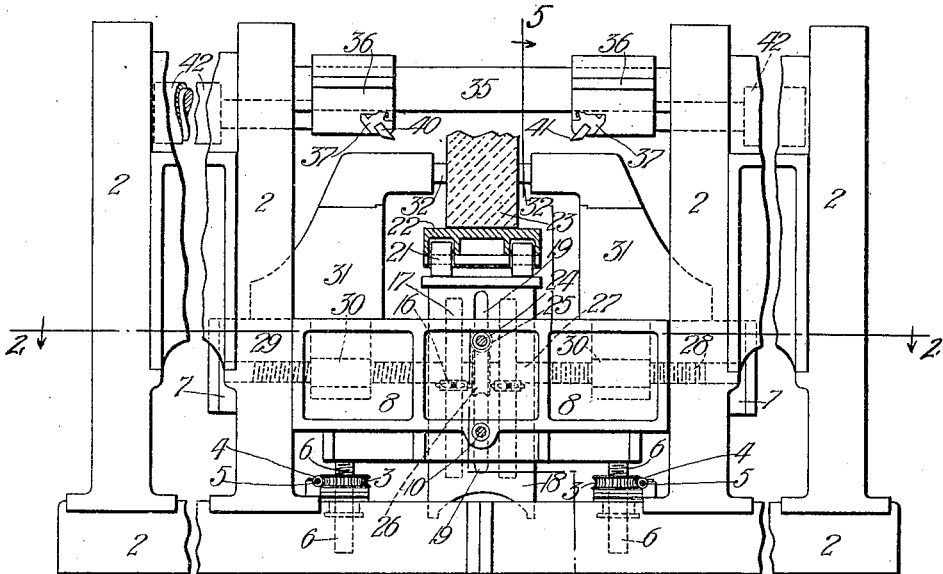
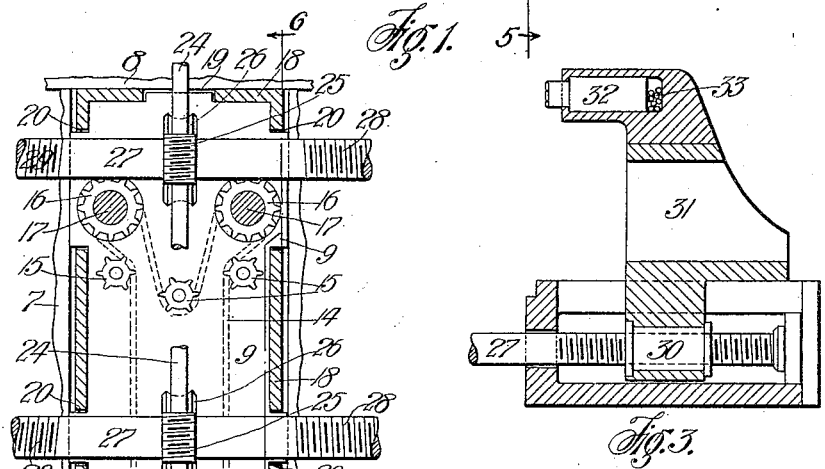
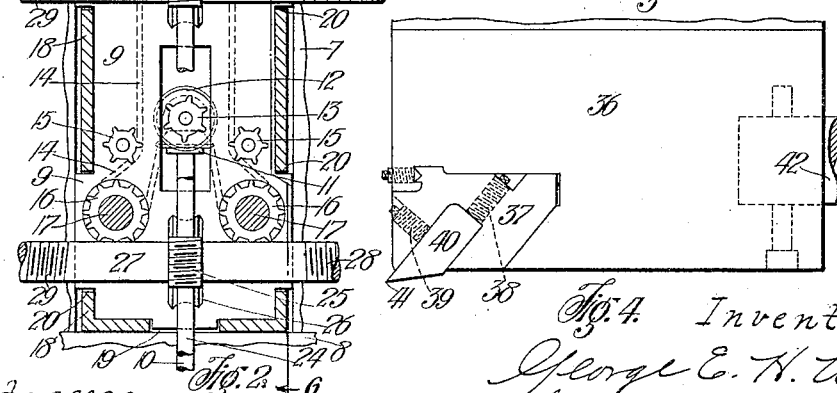
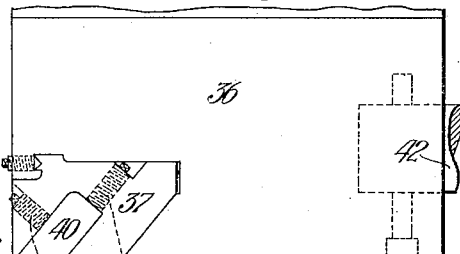
Inventor
George E. H. Woods
By Howell & Howell
Attorneys.
Witnesses.
L. Pauline Davis
W. Wallace Nairn Jr.

G. E. H. WOODS.
APPARATUS FOR DRESSING STONE.
APPLICATION FILED JUNE 28, 1915.

1,236,894.

Patented Aug. 14, 1917.
2 SHEETS—SHEET 2.

Witnesses
A. Pauline Davis
W. Wallace Nairn Jr

Inventor
George E. H. Woods
By Dowell & Dowell
Attorneys

UNITED STATES PATENT OFFICE.

GEORGE EDGAR HILL WOODS, OF DINGLEY, VICTORIA, AUSTRALIA.

APPARATUS FOR DRESSING STONE.

1,236,894. Specification of Letters Patent. Patented Aug. 14, 1917.

Application filed June 28, 1915. Serial No. 36,783.

*To all whom it may concern:*

Be it known that I, GEORGE EDGAR HILL WOODS, a subject of the King of Great Britain and Ireland, and a resident of the postal district of Dingley, near the post-town of Cheltenham, in the shire of Moorabbin, in the county of Bourke, State of Victoria, Commonwealth of Australia, (whose post-office address is Dingley Post-Office, near the said post-town of Cheltenham,) have invented a certain new and useful Improved Apparatus for Dressing Stone, of which the following is a specification.

This invention relates to an apparatus for dressing stone and has for its object to provide for the dressing of stone in an economical and expeditious manner.

But in order that this invention may be better understood reference will now be made to the accompanying sheets of drawings which are to be taken as part of this specification and read herewith:—

Figure 1 is a part sectional elevation of this invention, portions being broken away and removed for convenience of illustration.

Fig. 2 is a part sectional detail plan taken on the line 2—2 of Fig. 1 showing the gearing carried by a major elevator for vertically adjusting a minor elevator.

Fig. 3 is a detail view partly in section, of a sliding vise bracket carrying a sectional clamp.

Fig. 4 is a detail view of a sliding holder, cutter carrier and cutter, blade or knife.

Figure 5:
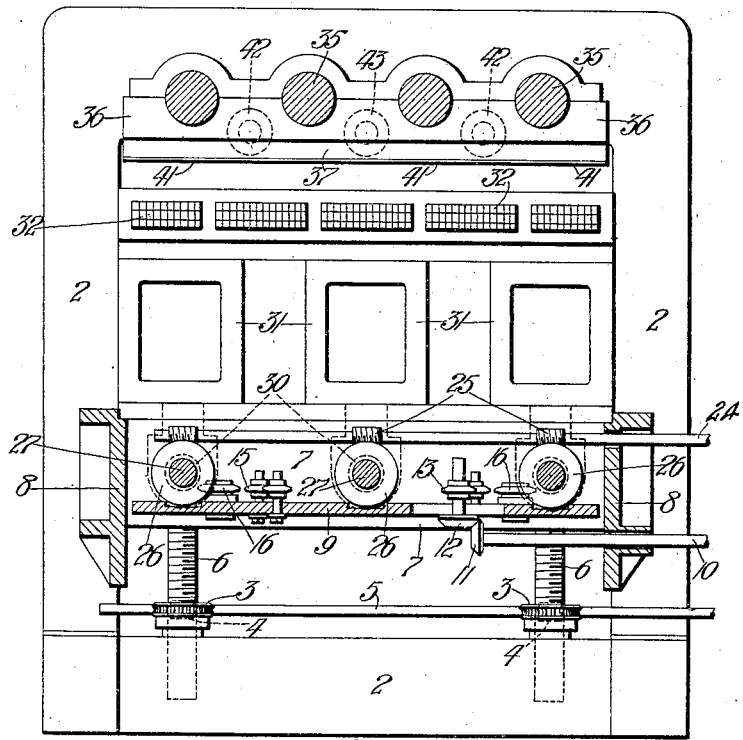
Fig. 5 is a central cross section taken on the line 5—5 of Fig. 1, a minor elevator and other parts and portions being broken away and omitted for convenience of illustration.
Figure 6:
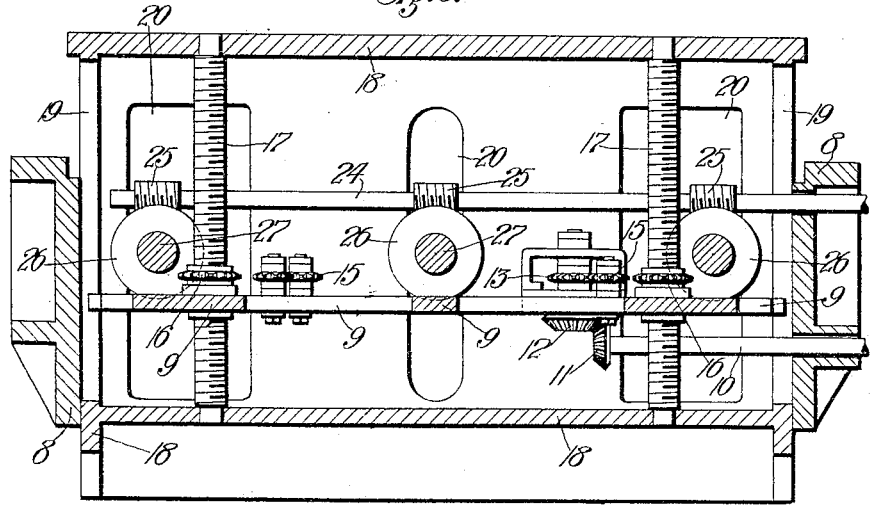
Fig. 6 is a detail cross section taken on the line 6—6 of Fig. 2 showing the arrangement in a minor elevator of gearing carried by the major elevator.

The apparatus for carrying the invention into effect includes a framework 2 of any suitable character. Mounted in the framework 2 is a plurality of worm wheel nuts 3 each engaged by a worm 4, the worms being secured to worm shafts 5. The shafts may be provided with suitable hand wheels, pulleys or the like whereby they may be readily rotated. Passing through each nut 3 is the lower end of a vertical screw 6, the upper ends of the screws 6 being secured to a major elevator. The major elevator preferably consists of two end frames 7 bearing in the framework 2. Connecting the end frames 7 are side frames or pieces 8. Extending between and secured to the end frames and the side frames is a central connecting piece or plate 9.

Outstanding from the major elevator is the outer end of a shaft 10 which outer end may carry a suitable hand wheel, pulley or the like. Carried by the inner end of the shaft 10 is a first bevel wheel 11 engaging a second bevel wheel 12. Rotated by the second bevel wheel 12 is a sprocket wheel 13 mounted on the plate 9. Driven by the sprocket wheel 13 is a sprocket chain 14 the tension of which is adjusted by suitable tension sprockets 15 carried by the said plate 9. The chain 14 operates a plurality of sprocket wheel nuts 16 also carried by the plate 9. Passing through each of the nuts 16 is a vertically disposed screw 17. The screws 17 are mounted in a minor elevator 18.

The minor elevator preferably approximates a box having formed therein side slotways, indicated at 19, to pass the shaft 10 and also to pass a worm shaft hereinafter described. The minor elevator is also provided with end slotways, indicated at 20, to pass threaded shafts hereinafter described. The slotways 19 and 20 permit of the minor elevator being adjusted vertically in relation to the major elevator.

Resting upon the top of the minor elevator 18 are the wheels 21 of a suitable truck 22 upon which the block of stone 23 to be dressed is secured. The stone may be retained in any suitable manner upon the truck and similarly the truck is secured to the minor elevator in any suitable way.

Outstanding from the major elevator is the outer end of a worm shaft 24. The outer end may have mounted thereon a suitable hand wheel, pulley or the like. The worm shaft may be mounted in suitable bearings carried by the plate 9. Carried by the worm shaft 24 and disposed within the minor elevator 18 is a series of worms 25 each engaging a worm wheel 26. Secured to each worm wheel 26 is a threaded shaft 27 having at one end a right hand thread, indicated at 28, and at the other end a left hand thread, indicated at 29. The threaded shafts 27 may be mounted in bearings carried by the major elevator. Engaging each of the threads 28 and 29 of each of the threaded shafts 27 is a nut 30. Secured to each nut 30 is a sliding vise bracket 31. The brackets 31 slide in the end frameworks 7 of the major elevator.

Mounted in each bracket 31 and above the major elevator is a sectional clamp or adapter. Each adapter consists of a plurality of independently sliding sections or pieces 32 which may be of any desired character. Carried in each bracket 31, behind its sectional clamp, is a series of pressure distributing balls 33. A clamp cover of suitable conformation may be employed with either of the clamps when the block of stone being dressed has a smooth surface as will be hereinafter more fully understood.

Disposed above the major and minor elevators and the sectional clamps is a series of guide bars 35 carried by the framework 2. Mounted upon the guide bars 35 are two opposite sliding holders 36. Mounted in each holder 36 is a cutter carrier 37 having a series of adjusting thrust screws 38 and a series of retaining screws 39. Mounted in each cutter carrier 37 is a cutter, blade or knife 40 the inner edge of which bears against the adjusting thrust screws 38 and the outer edge of which forms a cutting edge, indicated at 41.

Motion may be imparted each sliding holder in any suitable manner such as by hydraulic rams, indicated at 42 and 43, those rams indicated at 42 being adapted to feed the holders 36 inwardly, and the rams indicated at 43 feeding the holders outwardly. These rams may be of any ordinary character. Disposed between the rams and either above, below or between the guide bars 35 may be any suitable infeed reversing gear and any suitable outfeed reversing-gear. The rams of the two opposite holders 36 may also be interconnected if so desired. In any circumstances the slidable holders travel at a greater speed inwardly and outwardly.

With this invention a block of stone to be dressed is first placed upon the truck 22. It may be secured to the truck by any suitable clamps or in any other well known way. By operation of the worm shafts 5 the major elevator is lowered carrying with it the minor elevator, sliding vise brackets 31 and sectional clamps 32. By operation of the shaft 10 the minor elevator 18 may be adjusted in relation to the major elevator. The truck 22 with the stone block 23 thereon is now disposed upon the minor elevator 18. A ramp or the like may be provided for this purpose. By operation of the shafts 5 it is obvious that the major elevator and with it the minor elevator, stone and sectional clamps 32 may be raised to any desired position. By operation of the shaft 10 and consequent vertical movement of the minor elevator 18 in relation to the major elevator the height of the stone in relation to the clamps 32 may be adjusted with precision. Upon the worm shaft 24 being rotated the threaded shafts 27 will also rotate and the nuts 30 moving along the said shafts will cause the brackets 31 to move toward the stone which is thereby gripped by the sectional clamps. The balls 33 permit of each clamping section 32 accommodating itself to irregularities of the stone. The gripping pressure is also evenly distributed over the stone surface. By means of the infeeding rams 42 the blades or knives 40 are forced into the stone toward the center thereof. Any suitable control may be provided for the said rams. The blades or knives do not meet, as by any suitable automatically operating mechanism or by cutting off the pressure water supply of either of the rams 42 and turning on the pressure water supply of the corresponding out-feeding ram, one of the infeeding rams is reversed or withdrawn before it reaches the other. The outward movement or withdrawal of the blades or knives is effected by the outfeeding rams 43. Any suitable control may be provided for the said outfeeding rams. When an infeeding ram is thrown out of operation the corresponding outfeeding ram is brought into operation. By reversing the travel of one of the blades or knives 40 before the other it is obvious that two blades or knives, will, for a short period, travel in the same direction. In this manner no ridge is left upon the stone as would occur if the two blades or knives traveled inwardly toward the center of the stone and were withdrawn just before meeting. By over-running one of the blades or knives such a ridge is removed. When one side of the stone block has been dressed one sectional clamp may have applied thereto a suitable cover the treated surface of the stone being then, by re-arranging the stone upon the truck 22, disposed against the said cover. The cover may comprise a box or a plate secured in any suitable way. The object of bearing a treated surface against a cover or the like is to automatically cut the succeeding sides of the stone at right angles to that first treated and it is obvious that by providing covers having inclined or other bearing faces blocks of stone may be cut to varying shapes. In treating a block of stone a heavy cut or thick layer or slice may be first removed by means of the cutters, blades or knives 40. The major elevator, sliding vise bracket 31, clamps 32 and stone may then be moved bodily in a vertical direction by means of the worm shafts 5. The relationship between the stone and the elevator and clamps remains undisturbed as the minor elevator 18 moves with the major elevator unless the shaft 10 is operated. The amount of elevation is reduced or lessened for each cut, dependent upon the nature of the stone, so that each successive cut is lighter and a thinner layer or slice of stone removed than by the preceding cut. It is found that by operating in this manner the stone is not chipped at its edges and may be very finely dressed.

Having now described my invention what I claim as new and desire to secure by Letters Patent is—

Apparatus for dressing stone, comprising a framework, a major elevator mounted therein, means for adjusting the major elevator vertically, a minor elevator for supporting the stone, means for vertically adjusting the minor elevator in relation to the major elevator, stone clamping devices mounted on the major elevator, means for laterally adjusting said clamping devices, a plurality of cutters disposed above the clamping devices, and means for operating the cutters.

In testimony whereof I have hereunto affixed my signature in the presence of two subscribing witnesses.

GEORGE EDGAR HILL WOODS.

Witnesses:
CECIL W. P. PLASTREN,
FRANK H. CAIN.

Copies of this patent may be obtained for five cents each, by addressing the "Commissioner of Patents, Washington, D. C."